Oct. 3, 1967  G. M. BRUECKNER  3,344,916
TUBULAR CUSHIONING MEMBER FOR PACKAGING FRAGILE ARTICLES
Filed Oct. 11, 1965
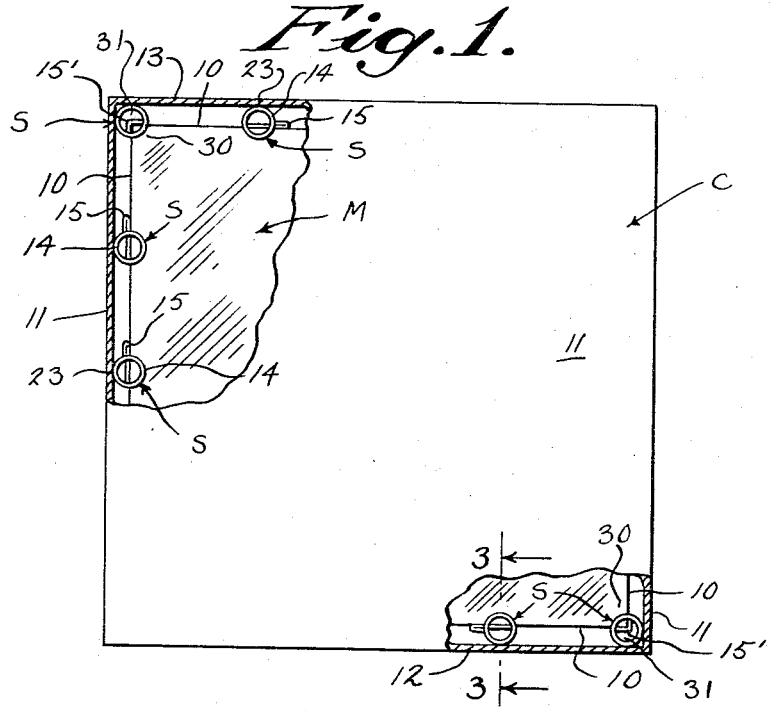
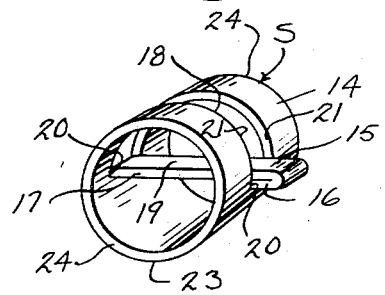
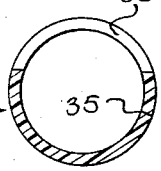
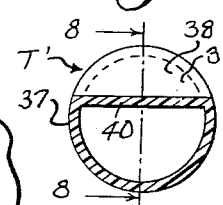
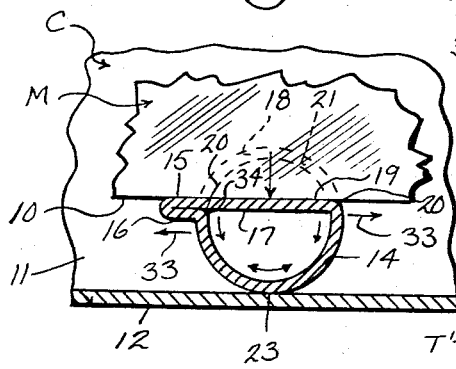
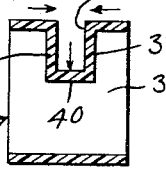
INVENTOR
GILBERT M. BRUECKNER
BY
George H. Wright

United States Patent Office 3,344,916
Patented Oct. 3, 1967

3,344,916
TUBULAR CUSHIONING MEMBER FOR PACKAGING FRAGILE ARTICLES
Gilbert M. Brueckner, Milwaukee, Wis., assignor to Vanant Company, Inc., Milwaukee, Wis., a corporation of Wisconsin
Filed Oct. 11, 1965, Ser. No. 494,608
1 Claim. (Cl. 206—62)

ABSTRACT OF THE DISCLOSURE

A packaging and cushioning means for fragile articles such as mirrors including a carton of a size and configuration to receive the article in spaced relation with all of the walls of the carton and a series of one-piece tubular cushioning members cut to the approximate width of the article, each cushioning member being identically formed and spaced about the peripheral edge of the mirror and having a transverse slot defining side supporting edges and a transversely extending tongue engaging the extreme outer edge of the article.

---

This invention appertains to packaging of fragile articles and more particularly to new and useful improvements in cushioning means for packaging mirrors, plate glass and the like for shipping.

In shipping mirrors and/or sheet glass particularly in cartons serious problems arise in properly cushioning the glass for shipment, and particularly in spacing the sides and peripheral edges of the glass from the sides and walls of the carton to effectively prevent cracking or breaking of the glass when the carton is jarred.

It is, therefore, a primary object of this invention to provide new and useful improvements in a cushioning and supporting device for the glass, so as to space the glass from the walls of the shipping carton.

Another object of the present invention is to provide a cushioning and suspension means for sheet glass and the like in tubular form having a transverse slot formed in the wall thereof to receive the peripheral edge of the glass.

A further object of the invention is to provide a cushioning member in tubular form which may be made from fiberboard, corrugated board, sheet plastic or molded plastic.

Still another object of the present invention is to provide a cushioning member in tubular form having a transverse slot therein for engaging the peripheral edge of the glass and wherein a reinforcing tongue is provided in the slot for added strength.

An important object of the present invention relies in providing a cushioning member of either paper board or plastic cut to the width of a carton and provided with a transverse slot to receive the peripheral edge of the glass and wherein a number of these tubular members can be placed around the edge of the glass in spaced relation to effectively carry and cushion the glass in spaced relation to all of the walls of the carton.

A salient feature of the invention resides in providing the tubular cushioning member in a molded plastic form having a walled transverse slot molded therein of a size and configuration to snugly receive the peripheral edge of the article to be shipped.

A still further object of the present invention is to provide a cushioning member that may be constructed from a continuous length of tubular material cut to a width corresponding to the width of the carton and provided with a transverse slot for snugly receiving the peripheral edge of the glass body and having means for reinforcing and supporting the glass body in spaced relation from all the walls of the carton.

With these and other objects in view, the invention consists in the novel construction, arrangement and formation of parts, as will be hereinafter more specifically described and claimed, and illustrated in the accompanying drawings, in which drawings, FIGURE 1 is a side elevational view of a carton carrying a mirror or plate glass and the like, certain parts being broken away and in section to illustrate the arrangement of the novel cushioning means;

FIGURE 2 is an end elevational view in perspective of a preferred form of the tubular cushioning member;

FIGURE 3 is a fragmentary transverse vertical section through the carton, the section being taken on the line 3—3 of FIGURE 1 of the drawings, and looking in the direction of the arrows;

FIGURE 4 is a fragmentary section taken at right angles to FIGURE 3, this section being represented by the line 4—4 of FIGURE 3 of the drawings, looking in the direction of the arrows;

FIGURE 5 is a fragmentary vertical transverse section similar to FIGURE 3 of the drawings, but illustrating how a number of mirrors can be effectively packaged and cushioned in a single carton.

FIGURE 6 is a transverse section through a modified form of the tubular cushioning member.

FIGURE 7 is a transverse section through a further modified form illustrating more particularly a tubular cushioning member molded from a plastic material, and FIGURE 8 is a longitudinal section of that form of the invention shown in FIGURE 7 of the drawings, the section being taken on the line 8—8 of FIG. 7, looking in the direction of the arrows.

Referring now to the drawings in detail, wherein similar reference characters designate corresponding parts throughout the several views, the letter C generally indicates a shipping carton for receiving a mirror and the like, protected by the novel cushioning members S which are placed about the peripheral edges 10 of the mirror M, as shown more particularly in FIGURE 1.

The carton C can be of any standard construction and fabricated from any desired material and generally the carton is of a size and configuration to receive the mirror and/or plate glass therein so that the glass can be effectively spaced from all of the sides and walls of the carton. Thus, the carton C includes the four vertically extending walls 11, a bottom wall 12 and a top wall 13.

Attention is now directed to the novel tubular cushioning member S and to that form of the invention illustrated primarily in FIGURES 1 to 4, inclusive. It can be seen that the member S is formed from a continuous tubular length cut to a width corresponding to the width of the carton. When the tube is formed from a paper or corrugated media two parallel slits are cut in the wall 14 and that portion of material between the slits is bent downwardly to form a tongue 15, one end of which protrudes beyond the wall 14 and is doubled as indicated by the reference numeral 16. Thus the tongue 15 includes a stretch 17 extending entirely across the slot 18 formed when the tongue is bent as described. Slot 18 of course is of a size and configuration to snugly fit over the peripheral edge 10 of the mirror or article to be shipped, and as shown in FIGURE 4 of the drawings, a portion of the edge 10 rests securely on the upper surface 19 of the tongue 15. This tongue adds protection and aids in preventing the sharp edges of the mirror or glass from tearing the corners 20 of the slot 18 and the glass is held firmly between the edges 21 in the aforementioned slot 18.

Thus in utilizing this form of the invention when a mirror M is to be shipped in a carton C a number of the tubular members S are placed about the peripheral edge in spaced relation as shown and the mirror is placed within the carton and it will be noted that the peripheral edges 10 of the glass are spaced from the end walls of the carton by the distance from the tongue to the outer edge 23 of the wall 14 and are spaced from the side vertical edges of the carton by resting in the slot 18 and by engagement of the ends 24 of the tube with the vertical walls of the carton. Thus, it can be seen that the glass or mirror is effectively cushioned and held in spaced relation to all of the walls of the carton and jarring of the carton during shipment will not be transmitted to the mirror M.

These cushioning members S are also utilized on the corners 30 of the mirrors M or sheet glass and in that event, the tongue 15′ is of a relatively shorter length than the tongue 15 and the corner is nested within the space or area 31 through the slot 18 as shown.

It is important to note that the cushioning member S in tubular form has many advantages over all known prior types of cushioning members, particularly since a force exerted at any point about the tubular wall 14 is transmitted equally in all directions about the wall. For example, noting particularly FIG. 4 of the drawings, if the carton should be jolted adjacent the point 23, the force or pressure would be dispersed or transmitted in both directions, as indicated by the lower arrow and further force in a downward direction as indicated by the arrow on the mirror would be equally dispersed on both sides of the walls of the tube, as indicated by the curved vertical arrows and thus the crushing of the cushioning member and any tendency to break the article is alleviated. Tongue 15 also forms a very important part of the invention, in that, a portion of the edge 10 of the mirror is tightly held against the upper surface 19 of the tongue, and pressure as indicated by the vertical arrow on the surface 19 of the tongue 15 will generally prevent, or aid in preventing, the collapsing of the wall 14 of the cushioning member S, particularly in an outward direction, as indicated by the arrows 33. The double layer of the tongue as indicated by the reference numeral 16 also aids measurably in preventing the tearing of the material at the point 34 and thus a very strong, effective and sturdy cushioning means is had.

Attention is now directed to FIGURE 5 of the drawings, and it will be readily apparent that a cushioning member S′ may be provided so that a plurality of mirrors M may be supported and cushioned in the same carton. To accomplish this, the cushioning member S′ is again cut to the width of the carton C′ and a number of slots 18′ in spaced relationship to one another are provided and each slot is likewise provided with the tongues 15′ and the mirrors are positioned in the slots, as shown. As previously brought out, this cushioning member may be also made from a plastic material. In FIGURE 6, therefore, I have illustrated a modified form of the invention wherein a cushioning member T is formed from a sheet of resilient plastic material and this sheet is merely rolled into a tubular shape and heat sealed at the point 35 to form the tube. A slot 36 is then cut in the plastic of a size and configuration to receive the peripheral edge 10 of the mirror M. It is also possible of course, that in this form of the invention wherein the tongue 15 is eliminated, that the sheet material could be of a corrugated media or paper board, but preferably this form is constructed from resilient sheet plastic material. It is also possible to mold the cushioning member from plastic and this form of the invention is illustrated in FIGURES 7 and 8 of the drawings, and thus, the cushioning member T′ is formed in a plastic mold of any well known type to provide a continuous circular wall 37 and a slot 38 molded therein to provide spaced side walls 39 and a bottom wall 40 and the slot 38 is again formed of a size and configuration to receive the peripheral edge 10 of the mirror M. This molded plastic form of the invention also has the advantage of tightly gripping the sides of the article being held therein, particularly when pressure is exerted on the bottom wall 40 in the direction of the arrow, FIGURE 8 of the drawings. This causes the sidewalls 39 to move toward one another as illustrated by the horizontal arrows, thus tightly gripping the sides of the article held therein.

From the foregoing, it is believed that the features and advantages of the invention will be readily apparent to those skilled in the art, and it will, of course be understood that changes in the form, proportion and minor details of construction may be resorted to without departing from the spirit of the invention or scope of the appended claim.

What I claim as new is:

A packaging and cushioning means for fragile articles in the nature of mirrors comprising in combination a carton having vertically extending side and end walls, bottom and top walls of a size and configuration to receive the article in spaced relation with all of said walls, a series of spaced cushioning members and supports for said article, each cushioning member having a body formed as a continuous one-piece tubular wall cut to the approximate width of said carton and placed within said carton to extend from one side wall to the other, said tubular wall having a pair of spaced parallel transverse slits cut therethrough and terminating at a point adjacent the longitudinal axial center of said body, the material between the slits being pushed down to provide a transversely extending tongue having one end folded to provide a double wall portion extending beyond the outer periphery of said tubular wall, the space between said parallel slits and said transversely extending tongue providing a transverse slot defined by side supporting edges and a supporting and strengthening wall receiving the peripheral edge of the article being shipped, the outer peripheral surface of the article engaging and resting on said transversely extending tongue.

References Cited
UNITED STATES PATENTS

| | | | |
|---|---|---|---|
| 2,019,778 | 11/1935 | Enholm et al. | 229—14 |
| 2,337,468 | 12/1943 | Higler | 206—65 |
| 2,410,591 | 11/1946 | Turner | 206—65 |
| 2,635,303 | 4/1953 | Poynter | 206—46 |
| 3,101,166 | 8/1963 | Van Antwerpen | 229—14 |
| 3,244,347 | 5/1966 | Jenk | 229—14 |

THERON E. CONDON, *Primary Examiner.*

WILLIAM T. DIXSON, JR., *Examiner.*